(12) United States Patent
May

(10) Patent No.: US 7,490,266 B2
(45) Date of Patent: Feb. 10, 2009

(54) INTEGRATED CIRCUIT AND PROCESSING SYSTEM WITH IMPROVED POWER SOURCE MONITORING AND METHODS FOR USE THEREWITH

(75) Inventor: Marcus W. May, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 441 days.

(21) Appl. No.: 11/352,695

(22) Filed: Feb. 13, 2006

(65) Prior Publication Data

US 2007/0226539 A1    Sep. 27, 2007

(51) Int. Cl.
*G06F 11/00* (2006.01)

(52) U.S. Cl. ......................................................... 714/22

(58) Field of Classification Search .................... 714/22
See application file for complete search history.

(56) References Cited

U.S. PATENT DOCUMENTS

| 5,781,448 A | * | 7/1998 | Nakamura et al. | .......... 700/293 |
| 5,822,600 A | * | 10/1998 | Hallowell et al. | .......... 713/340 |
| 2004/0078663 A1 | * | 4/2004 | Inaba | .......................... 714/22 |
| 2004/0093533 A1 | * | 5/2004 | Chapuis et al. | ................ 714/22 |

* cited by examiner

*Primary Examiner*—Michael C Maskulinski
(74) *Attorney, Agent, or Firm*—Ingrassia, Fisher & Lorenz, P.C.

(57) ABSTRACT

A processing system includes a direct current to direct current (DC-DC) converter for generating a supply voltage when coupled to a battery. A memory module stores a plurality of operational instructions. A processing module receives power from the DC-DC converter and executes the plurality of operational instructions. A power monitor circuit monitors the power source and powers down the power source when a first error condition is detected in the power source.

31 Claims, 8 Drawing Sheets

Processing system 125

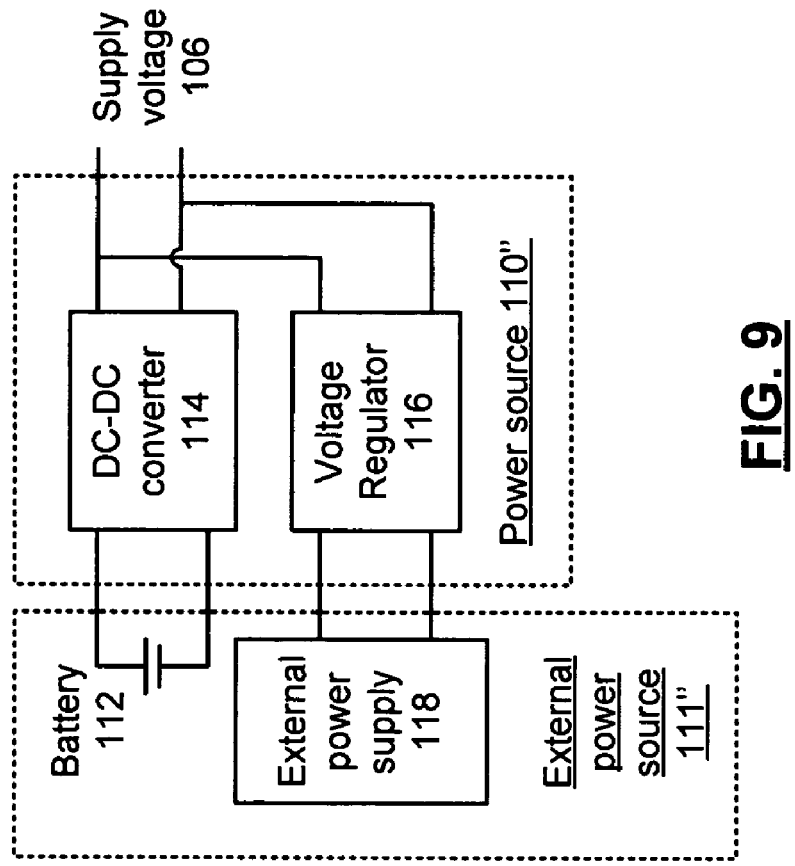
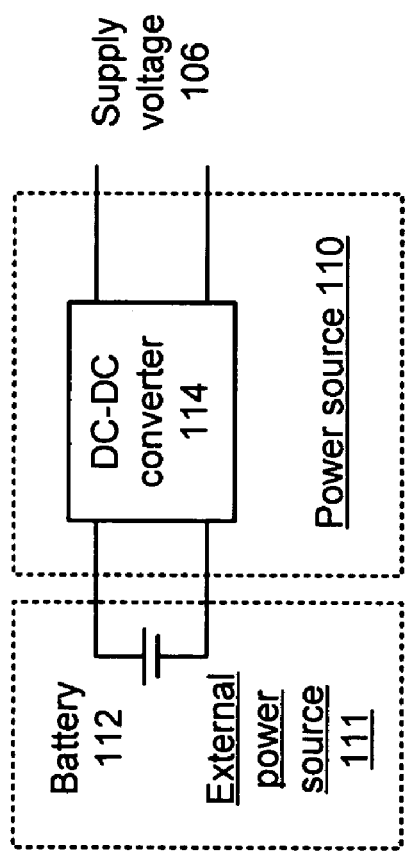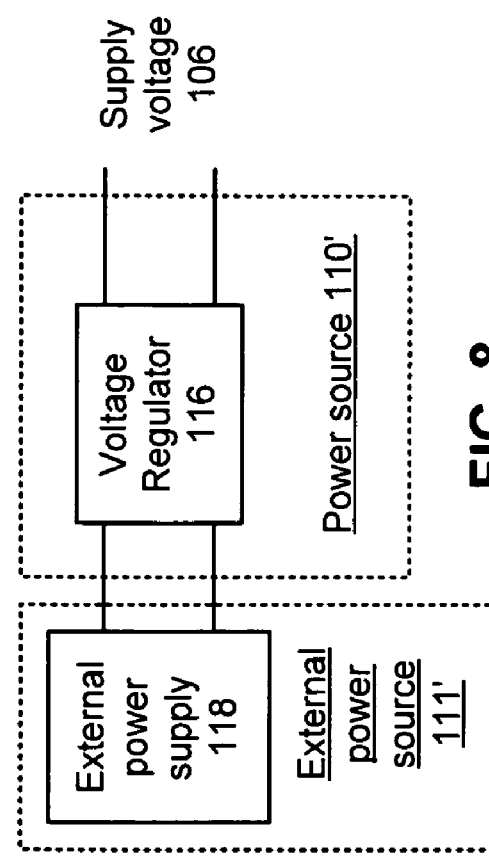

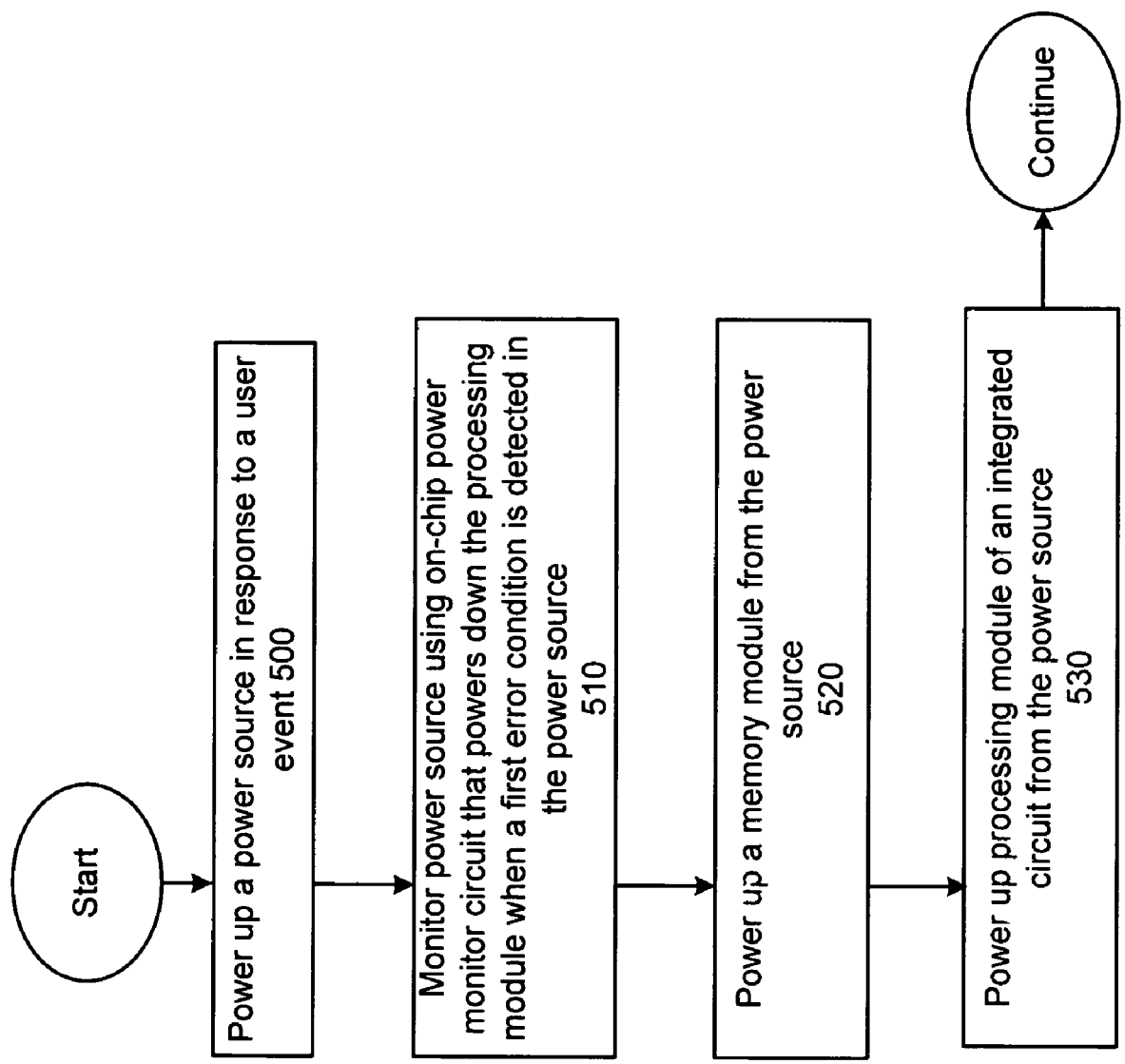

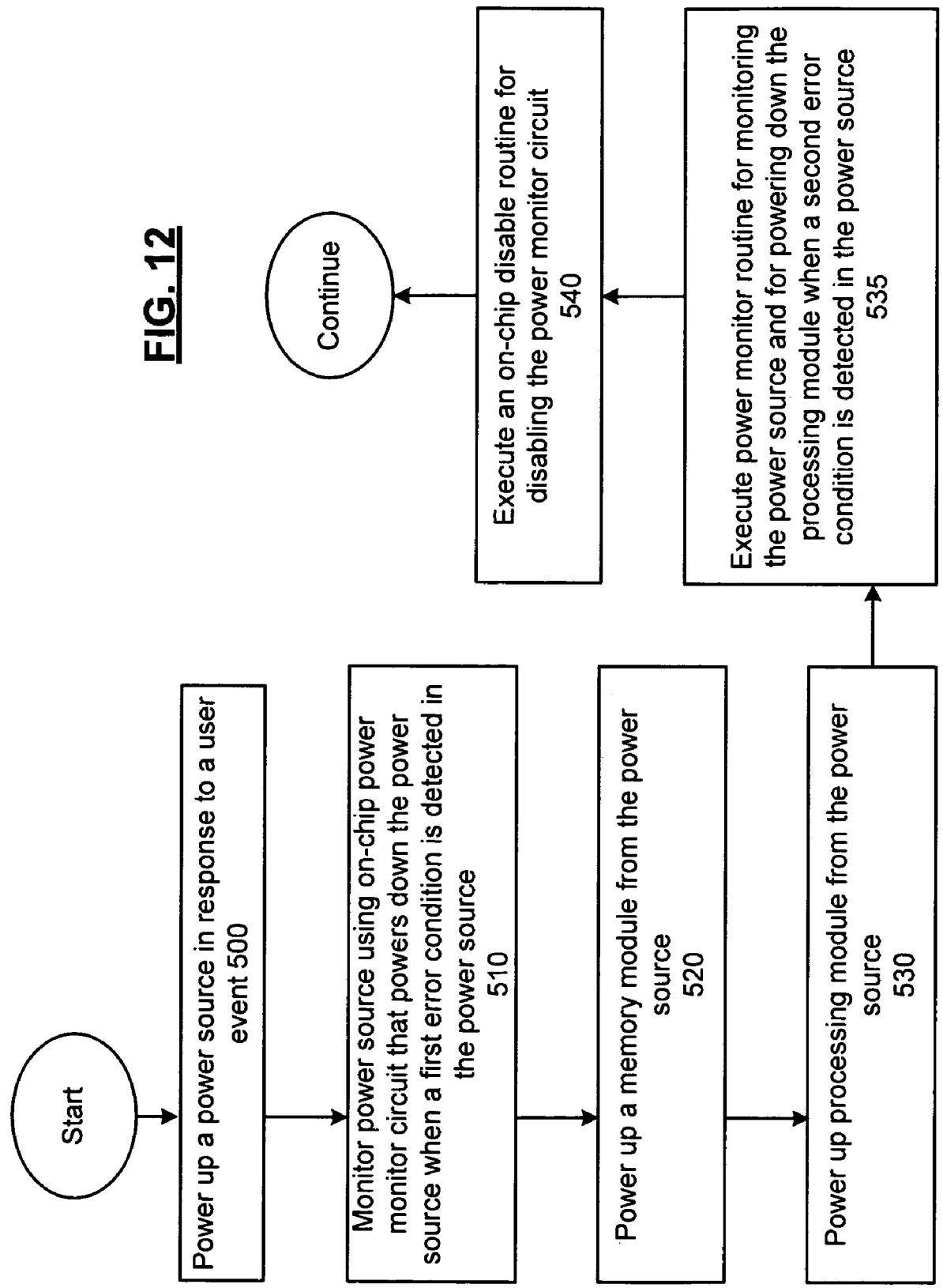

INTEGRATED CIRCUIT AND PROCESSING SYSTEM WITH IMPROVED POWER SOURCE MONITORING AND METHODS FOR USE THEREWITH

BACKGROUND OF THE INVENTION

1. Technical Field of the Invention

The present invention relates to processing systems as may be used in system on integrated circuits and related methods.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radios, pagers, cellular telephones, computer memory extensions (commonly referred to as thumb drives), etc. Each of these handheld devices includes one or more integrated circuits to provide the functionality of the device. As an example, a handheld FM radio receiver may include multiple integrated circuits to support the reception and processing of broadcast radio signals in order to produce an audio output that is delivered to the user through speakers, headphones or the like. Many such integrated circuits include a processing device that executes a sequence of instructions that are stored in memory.

These integrated circuits operate from a power source such as a battery or an external power supply. An interruption in the power source, caused by a low battery condition or disconnection of the external power supply, can cause the handheld device to hang-up, crash or otherwise malfunction. The need exists for an improved system for solving this problem, that can be implemented efficiently in conjunction with an integrated circuit.

BRIEF DESCRIPTION OF THE SEVERAL VIEWS OF THE DRAWINGS

FIGS. 7-9 present block diagram representations of several power sources in accordance with an embodiment of the present invention.

FIG. 10 presents a flowchart representation of a method in accordance with an embodiment of the present invention.

FIG. 12 presents a flowchart representation of a method in accordance with an embodiment of the present invention.

DETAILED DESCRIPTION OF THE INVENTION INCLUDING THE PRESENTLY PREFERRED EMBODIMENTS

Figure 2:
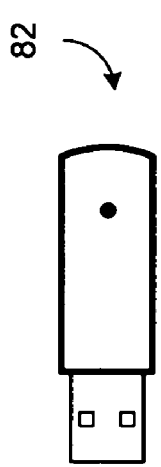
FIGS. 1-3 present a pictorial representation of representative handheld devices in accordance with an embodiment of the present invention.
Figure 3:
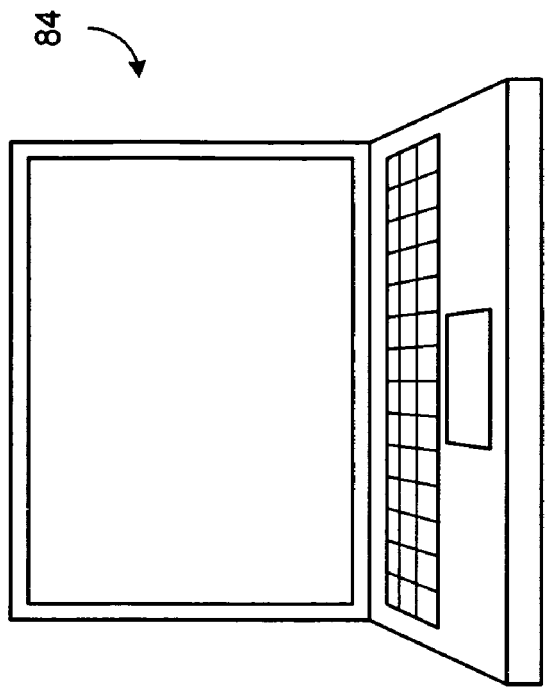
Figure 1:
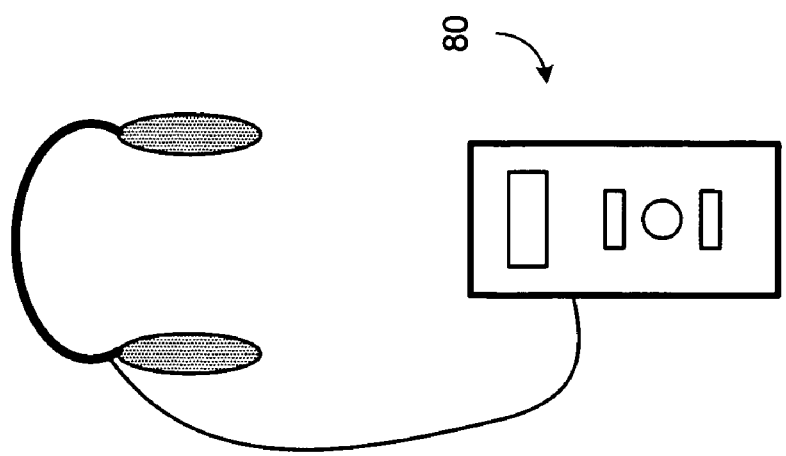

FIGS. 1-3 present a pictorial representation of representative handheld devices in accordance with an embodiment of the present invention. In particular, handheld audio system 80, universal serial bus (USB) device 82, in computer 84, are representative of the wide variety of electronic devices that can employ the integrated circuit, processing system or methods in accordance with the present invention, as described in conjunction with the figures that follow.

Figure 4:
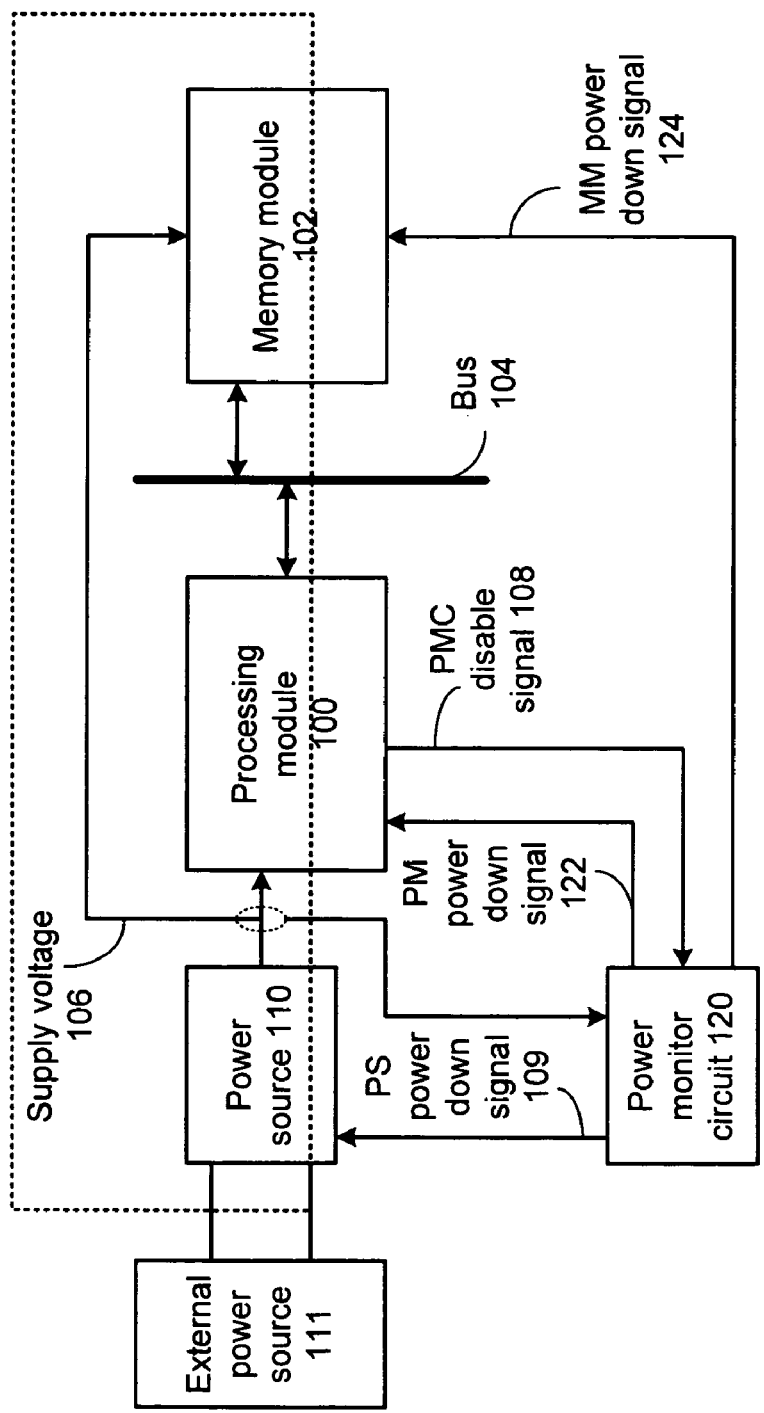
FIG. 4 presents a block diagram representation of a processing system in accordance with an embodiment of the present invention.

FIG. 4 presents a block diagram representation of a processing system in accordance with an embodiment of the present invention. In particular, processing system 125 includes a power source 110, coupled to an external power source 111, for generating a supply voltage 106 in response to a user event. Memory module 102 stores a plurality of operational instructions. Processing module 100, coupled to memory module 102 via bus 104, executes a plurality of operational instructions. Processing module 100 and optionally memory module 102, receive their power from the power source 110.

Power monitor circuit 120 is operatively coupled to monitor power source 110 to power down the power source 110 when a first error condition is detected. In an embodiment of the present invention, power monitor circuit 120 monitors the source voltage 106, a source current or other condition of the power source 110. In the event of an error, such as a low voltage condition, a rapid voltage drop, a voltage spike, or other error condition, the power monitor circuit 120 asserts a power source power down signal 109 that causes power source 110 to power down in a predictable fashion.

In an embodiment of the present invention power monitor circuit 120 includes a comparator with hysteresis, for asserting the power source power down signal 109 when the source voltage 106 falls below a low voltage threshold. In particular, the low voltage threshold is chosen to correspond to a minimal reserve power, and the shut, down of the power source 110 is delayed slightly to allow power monitor circuit 120 sufficient time to power down processing module 100 by asserting processing module power down signal 122 and memory module 102 by asserting memory module power down signal 124. In this fashion, the processing module 100 and memory module 102 can be powered down in an organized fashion, in an attempt to avoid malfunction or other hang-up of processing system 125, etc.

In alternative embodiments of the present invention, more complicated power monitor circuits 120 can be implemented with multiple fault detectors, or less complex circuits with less power down signals, etc. In particular, power down circuit 120 may power down only a single device such as power source 110 or the processing module 100, other devices, the entire processing system 125. When processing system 125 is implemented as an integrated circuit, power down circuit 120 may power down the integrated circuit.

In an embodiment of the present invention, processing module 102 executes a plurality of operational instructions that include a power monitoring routine for monitoring the power source and for powering down the processing module when a second error condition is detected in the power source. In addition, processing module 102 further includes a disable routine for disabling the power monitor circuit 120. In particular, in response to the disable routine, processor module 102 asserts power monitor circuit disable signal 108 that disables power monitor circuit 120. In embodiments of the present invention, the first error condition can be either the same as, or different from, the second error condition.

Processing module 100 can be implemented using a microprocessor, micro-controller, digital signal processor, micro-computer, central processing unit, field programmable gate array, programmable logic device, state machine, logic circuitry, analog circuitry, digital circuitry, and/or any device that manipulates signals (analog and/or digital) based on operational instructions. Memory module 102 can be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions illustrated herein.

In an embodiment of the present invention, various components of processing system 125 are implemented on an integrated circuit. In particular, processing system 125 can be implemented using a system on a chip integrated circuit. Other implementations including multiple integrated circuits and/or one or more discrete components can likewise be implemented within the broad scope of the present invention.

Figure 5:
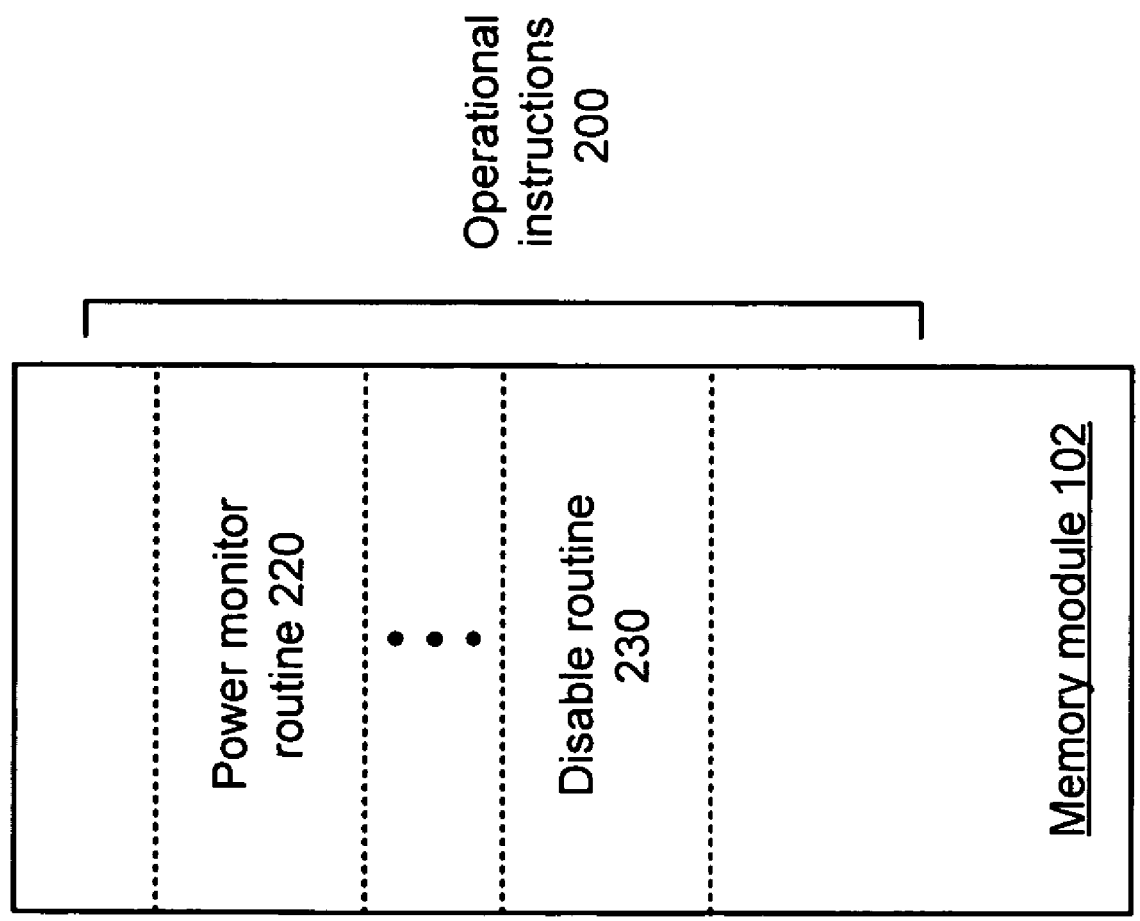
FIG. 5 presents a block diagram representation of a memory module in accordance with an embodiment of the present invention.
Figure 6:
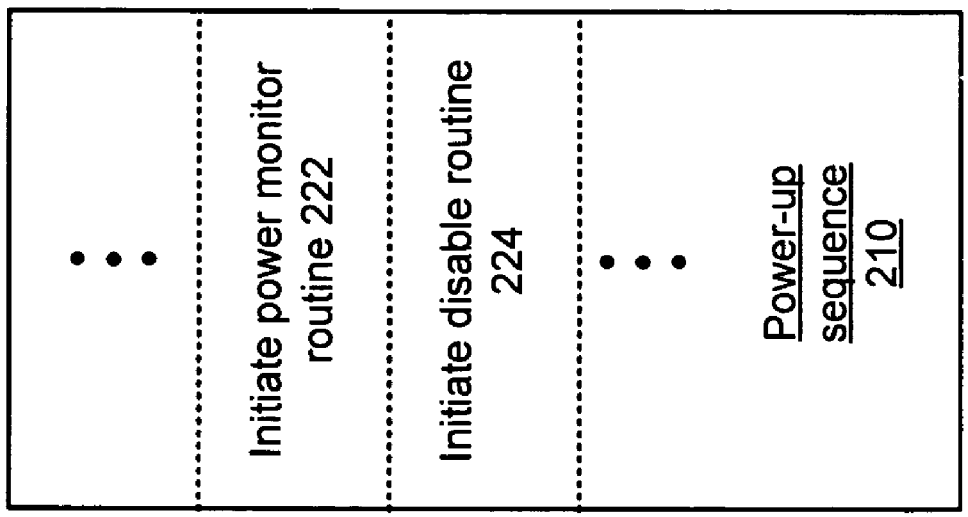
FIG. 6 presents a tabular representation of power-up sequence in accordance with an embodiment of the present invention.

Further details regarding the power monitoring routine and disable routine will be presented in conjunction with FIGS. 5 and 6 that follow.

FIG. 5 presents a block diagram representation of a memory module in accordance with an embodiment of the present invention. In particular, memory module 102 includes operational instructions 200 that include power monitor routine 220 and disable routine 230. In an embodiment of the present invention, these operational instructions correspond to software routines that are executed by processing module 100, other hardware and firmware embodiments can likewise be implemented as discussed in conjunction with FIG. 4.

The power monitor routine operates to power down at least the processing module 100 in response to the detection of a second error condition, either directly or by powering down the power source 110. In an embodiment of the present invention, the power monitor routine may provide the functionality discussed in conjunction with the power monitor circuit 120 by accessing one or more signals, such as status signals generated directly by the power source 110, or through the use of external components such as one or more analog to digital converters, voltage sensors, current sensors, comparators, voltage dividers, etc. In this fashion, the second error condition can be a low voltage condition, a rapid voltage drop, or a voltage spike, etc. However, the implementation of power monitor routine 220 using operational instructions 200 and processing module 100 allows power monitor routine 220 to include additional features and functions that may not be present in power monitor circuit 120.

In an embodiment of the present invention, power monitor routine 220 can includes operational instructions to preserve at least one processing module state that can be recovered during a subsequent restart of the processing system 125. Examples include register values, stack values, program variables and/or other states, status parameters or other conditions of processing module 102 that, when recovered during a restart of processing module 125, avoid the loss of data or otherwise allow the user of processing system 125 to potentially "pick-up where they left off" prior to the second condition and subsequent power down of processing module 102 and/or other modules of processing system 125. In an embodiment, power monitor routine 220 includes operational instructions that copy designated register values, stack values, program variables, and/or states, status parameters etc, to a nonvolatile memory or other persistent memory or persistent registers of memory module 102 for recovery during a subsequent power-up sequence 210 and restart of processing module 102.

In an embodiment of the present invention, power monitor routine 220 further includes operational instructions to modify a processing module parameter when a third error condition is detected. For instance, in a system operating from battery power, when monitored power conditions such as remaining battery charge or supply voltage 106 indicate that the reserve power has fallen below a threshold (that indicates a limited power reserve, greater than the reserve necessary to begin a power down of the system, but still lower than a desired power reserve required for sustained operation of the system at full capacity), power monitor routine may operate to place one or more elements of processing system in a low power mode to preserve the remaining power reserve. For instance, power monitor routine 220 may lower the operating frequency of processing module 100, turn off peripheral devices and interfaces such as touch screens, or display devices, or operate these devices with reduced power. In addition, power monitor routine may suspend non-critical applications, or reduce other functions and features of the device until the battery can be recharged or the device can be coupled to an alternative power source such as an external power supply. Further, the power monitor routine may provide some user indication of the reduced power module, such as by an audible tone, indicator light, icon, or by the lack of an indicator light, icon, etc.

FIG. 6 presents a tabular representation of power-up sequence in accordance with an embodiment of the present invention. In particular, power-up sequence 210 is presented that includes initiating a power monitor routine 222, such as power monitor routine 220, and initiating a disable routine 224, such as disable routine 230. In an embodiment, power-up sequence 210 is ordered such that disable routine 230 is executed after the power monitor routine 220 is initiated. In this fashion, power monitor circuit 120 is enabled to monitor the power source 110 during the initial portion of the power-up sequence 210.

In an embodiment of the present invention, power-up sequence 210 is implemented as a table of data stored in memory module 102, a sequence of states in a state machine or other sequence of instructions that are coded or configured in the system to operate in the sequence presented.

By way of example, as processing system 125 is powered on in response to a user event, such as processing system 125 receiving a power enable signal in response to a user pressing a button, by inserting a battery, by connecting a power source or power otherwise being switched on or otherwise applied. A power-up sequence 210 is executed that includes powering on power source 110, power monitor circuit 120 and memory module 102. Once these devices are operational, processing module 100 is powered up and a boot program is executed that causes the processor module 100 to load and begin execution of various routines. Power monitor routine 220 is initiated as part of the boot program. After the power monitor routine becomes operational to monitor the power source 110, it disables power monitor circuit 120.

This configuration provides several advantages. In an embodiment of the present invention, power monitor circuit 120 is implemented efficiently with minimal functionality to monitor power source 110 during the power-up sequence 210 for one or more error conditions. In particular, power monitor circuit 120 can be designed to detect error conditions that could occur while the processing system 125 is powering up that could cause a system malfunction, hang-up, or crash, etc. These error conditions could include a low voltage, rapid drop in voltage or voltage spike caused by insufficient battery voltage, the disconnection of an external power supply, mechanical transients in the connection of the external power supply or by other battery or external power supply faults. Power monitor circuit 120 operates during the portion of the power-up sequence 210 that occurs before the power monitor routine 220 is operational. As previously discussed, the power monitor routine 220 includes functions and features that are above and beyond the capabilities of power monitor circuit 120. Once the power monitor routine 220 becomes operational, power monitor circuit 120 is disabled to avoid a conflict between the two power monitoring mechanisms.

FIGS. 7-9 present block diagram representations of several power sources in accordance with an embodiment of the present invention. In FIG. 7, a power source 110 is presented that includes a direct current to direct current (DC-DC) converter 114 that converts the voltage from a battery 112 of external power source 111 into supply voltage 106. In FIG. 8, power source 110' includes a voltage regulator 116 that produces supply voltage 106 by regulating the voltage from an external power supply 118 of external power source 111'. In FIG. 9, external power source 111" includes both a battery 112 and an external power supply 118. Power source 110" generates supply voltage 106 from external power supply 118, when connected, via voltage regulator 116. Alternatively, supply voltage 106 is provided by battery 112 through use of DC-DC converter 114.

FIG. 10 presents a flowchart representation of a method in accordance with an embodiment of the present invention. In particular, a method is presented for use in conjunction with one or more features and functions described in association with FIGS. 1-9. In step 500 a power source is powered up in response to a user event, such as by receiving a power enable signal in response to a user pressing a button, inserting a battery, connecting a power source or power otherwise being switched on or otherwise applied. In step 510, the power source is monitored using an on-chip power monitor circuit of an integrated circuit and is powered down when a first error condition is detected in the power source. In step 520, a memory module is powered up from the power source. In step 530, a processing module of an integrated circuit is powered up from the power source. In an embodiment of the present invention, the first error condition includes one or more of a low voltage condition, a rapid voltage drop, and/or a voltage spike.

Figure 11:
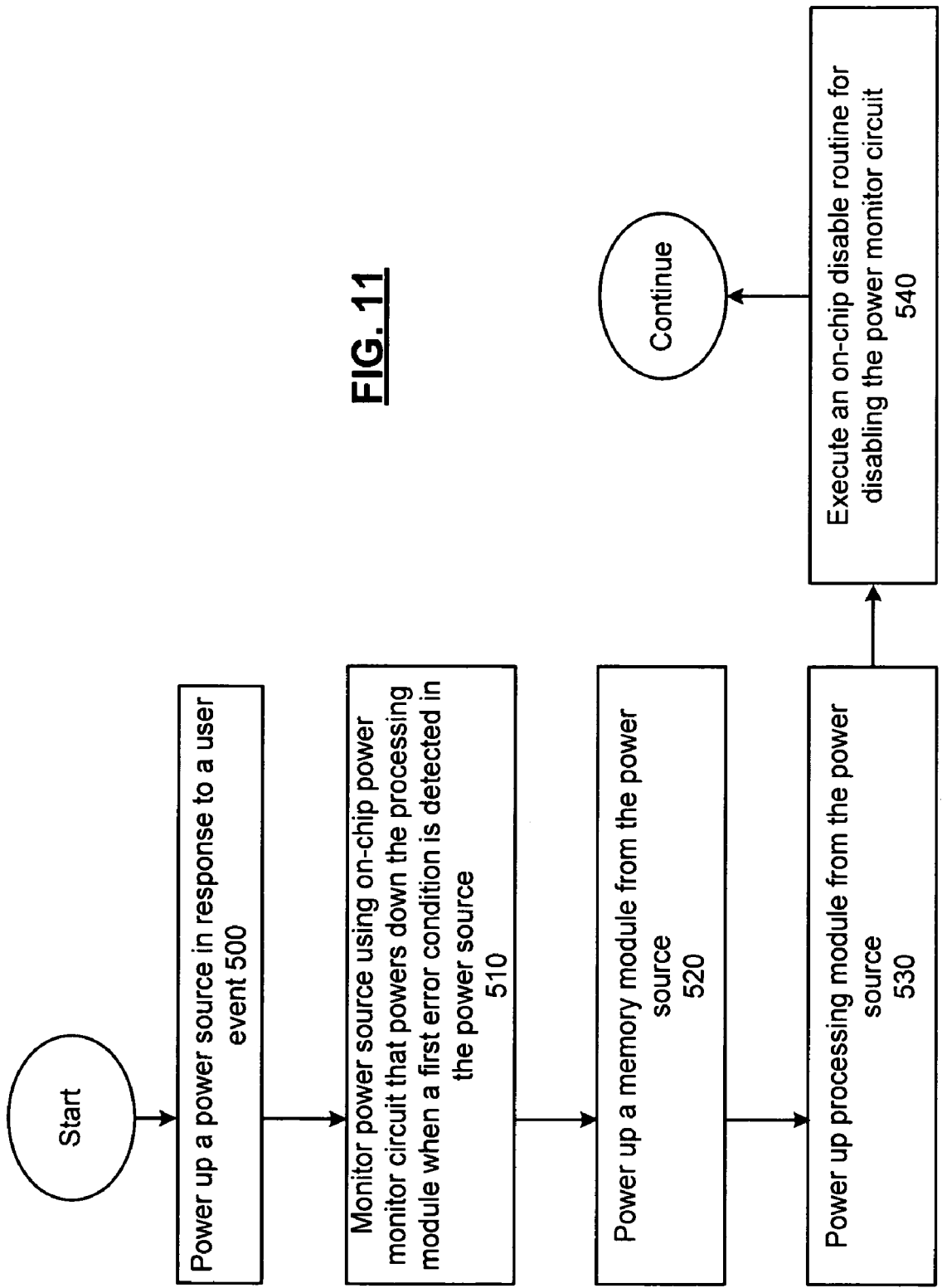
FIG. 11 presents a flowchart representation of a method in accordance with an embodiment of the present invention.

FIG. 11 presents a flowchart representation of a method in accordance with an embodiment of the present invention. A method is presented for use in conjunction with one or more features and functions described in association with FIGS. 1-10. In particular, a method is presented that includes many of the steps discussed in conjunction with FIG. 10, and further includes step 540 of executing an on-chip disable routine of the integrated circuit for disabling the power monitor circuit.

FIG. 12 presents a flowchart representation of a method in accordance with an embodiment of the present invention. A method is presented for use in conjunction with one or more features and functions described in association with FIGS. 1-11. In particular, a method is presented that includes many of the steps discussed in conjunction with FIG. 11, and further includes step 535 of executing a power monitor routine for monitoring the power source and for powering down the processing module when a second error condition is detected in the power source.

In an embodiment of the present invention, the disable routine is executed after the power monitor routine is initiated. Further, the power monitor routine optionally includes operational instructions to modify a processing module parameter when a third error condition is detected and also, operational instructions to preserve at least one processing module state that can be recovered during a subsequent restart of the processing module.

In an embodiment, the second error condition includes one of: a low voltage condition, a rapid voltage drop, and a voltage spike; wherein the first error condition is the same as, or different from, the second error condition.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In an embodiment, the various circuit components are implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing an integrated circuit and processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A processing system comprising:
   a direct current to direct current (DC-DC) converter configured to generate a supply voltage when coupled to a battery;

a memory module configured to store a plurality of operational instructions;

a processing module, operatively coupled to the memory module, that is configured to execute the plurality of operational instructions, the processing module receiving power from the DC-DC converter; and a power monitor circuit, operatively coupled to the DC-DC converter, that is distinct from and in communication with the processing module and that is configured to monitor the DC-DC converter and to power down the DC-DC converter and the processing module when a first error condition is detected in the DC-DC converter.

2. The processing system of claim 1 wherein the plurality of operational instructions include a disable routine for disabling the power monitor circuit.

3. The processing system of claim 2 wherein the disable routine is executed as part of a power-up sequence for the processing module.

4. The processing system of claim 1 wherein the power monitor circuit is further configured to monitor the supply voltage and to power down the DC-DC converter when a second error condition is detected in the DC-DC converter.

5. The processing system of claim 4 wherein the power monitor circuit is further configured to power down the processing module when the second error condition is detected.

6. The processing system, of claim 4 wherein the power monitor circuit is further configured to modify a processing module parameter when a third error condition is detected.

7. The processing system of claim 4 wherein the second error condition includes one of: a low voltage condition, a rapid voltage drop, and a voltage spike.

8. The processing system of claim 1 wherein the power monitor circuit is further configured to power down the processing module prior to powering down the DC-DC converter to thereby preserve at least one processing module state that can be recovered during a subsequent restart of the processing module.

9. The processing system of claim 1 wherein the first error condition includes one of: a low voltage condition, a rapid voltage drop, and a voltage spike.

10. The processing system of claim 1 wherein the processing system is implemented on an integrated circuit, and wherein the power monitor circuit is an on-chip power monitor circuit.

11. An integrated circuit comprising:

a power source configured to generate a supply voltage;

a memory module configured to store a plurality of operational instructions;

a processing module, operatively coupled to the memory module, that is configured to execute the plurality of operational instructions, the processing module receiving power from the power source; and a power monitor circuit, distinct from and operatively coupled to the processing module and the power source, that is configured to monitor the power source and to power down the processing module and the power source when a first error condition is detected in the power source.

12. The integrated circuit of claim 11 wherein the plurality of operational instructions include a disable routine for disabling the power monitor circuit.

13. The integrated circuit of claim 12 wherein the disable routine is executed as part of a power-up sequence for the processing module.

14. The integrated circuit of claim 11 wherein the power monitor circuit is further configured to monitor the power source and for powering down the processing module when a second error condition is detected in the power source.

15. The integrated circuit of claim 14 wherein the power monitor circuit is further configured to modify a processing module parameter when a third error condition is detected.

16. The integrated circuit of claim 14 wherein the second error condition includes one of: a low voltage condition, a rapid voltage drop, and a voltage spike.

17. The integrated circuit of claim 11 wherein the power monitor circuit is further configured to power down the processing module prior to powering down the DC-DC converter to thereby preserve at least one processing module state that can be recovered during a subsequent restart of the processing module.

18. The integrated circuit of claim 11 wherein the first error condition includes one of: a low voltage condition, a rapid voltage drop, and a voltage spike.

19. The integrated circuit of claim 11 wherein the processing module and memory module are implemented on a digital portion of the system on a chip integrated circuit.

20. The integrated circuit of claim 11 wherein the power source includes a direct current-to-direct current (DC-DC) converter.

21. The integrated circuit of claim 20 wherein the power monitor circuit powers down the DC-DC converter.

22. The integrated circuit of claim 20 wherein the power monitor circuit powers down the integrated circuit.

23. A method comprising:

powering up a power source in response to a user event to thereby provide power to a processing module of an integrated circuit;

monitoring the power source using an on-chip power monitor circuit of the integrated circuit; and powering down the power source and the processing module from the on-chip power monitor circuit when a first error condition is detected in the power source.

24. The method of claim 23 further comprising: executing an on-chip disable routine of the integrated circuit for disabling the power monitor circuit.

25. The method of claim 24 further comprising: executing a power monitor routine for monitoring the power source and for powering down the processing module when a second error condition is detected in the power source.

26. The method of claim 25 wherein the disable routine is executed after the power monitor routine is initiated.

27. The method of claim 25 wherein the power monitor routine includes operational instructions to modify a processing module parameter when a third error condition is detected.

28. The method of claim 25 wherein the power monitor routine includes operational instructions to preserve at least one processing module state that can be recovered during a subsequent restart of the processing module.

29. The method of claim 25 wherein the second error condition includes one of: a low voltage condition, a rapid voltage drop, and a voltage spike.

30. The method of claim 25 wherein the first error condition is the same as the second error condition.

31. The method of claim 25 wherein the first error condition differs from the second error condition.

* * * * *